(12) United States Patent
Wang (10) Patent No.: US 8,780,767 B2
(45) Date of Patent: *Jul. 15, 2014

(54) METHODS AND APPARATUS FOR INCLUDING MODE INFORMATION IN A FRAME FOR SYSTEM ACQUISITION

(75) Inventor: Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/951,294

(22) Filed: Nov. 22, 2010

(65) Prior Publication Data

US 2011/0064007 A1    Mar. 17, 2011

Related U.S. Application Data

(63) Continuation of application No. 12/178,201, filed on Jul. 23, 2008, now Pat. No. 7,860,036.

(60) Provisional application No. 60/971,201, filed on Sep. 10, 2007.

(51) Int. Cl.
*H04J 3/00* (2006.01)

(52) U.S. Cl.
USPC .......................................... 370/280; 370/281

(58) Field of Classification Search
USPC .................. 370/276–281, 294–296, 515, 517
See application file for complete search history.

(56) References Cited

U.S. PATENT DOCUMENTS

| | | | |
|---|---|---|---|
| 5,590,173 A * | 12/1996 | Beasley | 370/307 |
| 5,987,010 A | 11/1999 | Schnizlein | |
| 6,016,311 A * | 1/2000 | Gilbert et al. | 370/280 |
| 6,269,086 B1 * | 7/2001 | Magana et al. | 370/280 |
| 6,611,507 B1 * | 8/2003 | Hottinen et al. | 370/331 |
| 6,788,253 B1 | 9/2004 | Calin | |
| 7,860,036 B2 | 12/2010 | Wang | |
| 2001/0043572 A1 | 11/2001 | Bilgic et al. | |

(Continued)

FOREIGN PATENT DOCUMENTS

| DE | 19957031 A1 | 5/2001 |
|---|---|---|
| EP | 1631098 A1 | 3/2006 |

(Continued)

OTHER PUBLICATIONS

European Search Report—EP10016170—Search Authority—Munich—Dec. 9, 2011.

(Continued)

*Primary Examiner* — Kevin Mew
(74) *Attorney, Agent, or Firm* — Peng Zhu (57) ABSTRACT

Methods and apparatus for including mode information in a wireless transmission frame, which is useful for system acquisition. In particular, a first information bit is provided in a preamble of a transmission frame, where the bit is configured to indicate that a wireless communication system is operating according to either a time division duplex (TDD) mode or a frequency division duplex (FDD) mode. The addition of a single bit minimally affects the resources of the preamble. Additionally, another bit resource already present in the preamble for normally communicating whether FDD transmissions are full duplex or half-duplex transmissions, may be further allocated to indicate partitioning information concerning TDD mode transmissions when the first bit indicates TDD mode, thus affording additional information communicated in the frame without increasing preamble resources.

35 Claims, 4 Drawing Sheets

(56) References Cited

U.S. PATENT DOCUMENTS

| | | |
|---|---|---|
| 2007/0054667 A1 | 3/2007 | Lee et al. |
| 2007/0097887 A1 | 5/2007 | Kim et al. |
| 2007/0097908 A1 | 5/2007 | Khandekar et al. |
| 2007/0161389 A1* | 7/2007 | Khandekar ............ 455/517 |
| 2008/0165675 A1 | 7/2008 | Yang et al. |
| 2008/0165709 A1 | 7/2008 | Soliman |
| 2008/0166969 A1 | 7/2008 | Gorokhov et al. |
| 2009/0052355 A1 | 2/2009 | Jung et al. |
| 2009/0262671 A1 | 10/2009 | Seol et al. |
| 2010/0020731 A1 | 1/2010 | Bourdeaut et al. |
| 2010/0027511 A1* | 2/2010 | Terry ..................... 370/335 |
| 2010/0046403 A1* | 2/2010 | Kishiyama et al. ...... 370/280 |
| 2010/0290371 A1* | 11/2010 | Beale .................... 370/280 |
| 2013/0250818 A1* | 9/2013 | Gaal et al. ............. 370/277 |

FOREIGN PATENT DOCUMENTS

| | | |
|---|---|---|
| JP | 2006197586 A | 7/2006 |
| JP | 20099522951 | 6/2009 |
| RU | 2233540 C2 | 7/2004 |
| WO | WO0016513 | 3/2000 |
| WO | WO0054536 A1 | 9/2000 |
| WO | WO2006102746 A1 | 10/2006 |
| WO | WO2007050854 | 5/2007 |

OTHER PUBLICATIONS

IEEE P802.20TM/D1.0mn, "Draft Standard for Local and Metropolitan Area Networks—Standard Air Interface for Mobile Broadband Wireless Access Systems Supporting Vehicular Mobility—Physical and Media Access Control Layer Specification," pp. 858-859 (Jul. 2007).

International Search Report & Written Opinion—PCT/US2008/075887, International Search Authority—European Patent Office—Feb. 6, 2009.

* cited by examiner

METHODS AND APPARATUS FOR INCLUDING MODE INFORMATION IN A FRAME FOR SYSTEM ACQUISITION

CROSS-REFERENCE TO RELATED APPLICATION

The present application for patent is a Continuation of U.S. patent application Ser. No. 12/178,201, entitled "METHODS AND APPARATUS FOR INCLUDING MODE INFORMATION IN A FRAME FOR SYSTEM ACQUISITION," filed Jul. 23, 2008, now allowed, which claims priority to U.S. Provisional Application No. 60/971,201, entitled "METHOD AND APPARATUS FOR INCLUDING TDD/FDD MODE AND TDD PARTITION INFORMATION IN ACQINFO BLOCK FOR SYSTEM ACQUISITION," filed Sep. 10, 2007, both of which are incorporated herein by reference in their entirety.

BACKGROUND

1. Field

The present disclosure generally relates to methods and apparatus for including mode information in a frame for system acquisition, and more particularly to including mode information in a frame preamble concerning whether a transmission in a TDD or FDD mode.

2. Background

In particular communication systems that support both frequency division duplex (FDD) and time division duplex (TDD) communication modes, acquisition of timing information during system acquisition at a user equipment (UE) is dependent on the particular communication mode. Accordingly, a user device operable in such systems has to determine whether a current transmission mode is FDD or TDD before timing acquisition. Various known communication systems, however, do not actively communicate the particular mode of operation, thus leading to difficulty and inefficiency in acquiring timing information during system acquisition.

Further, in particular types of these systems, such as the Mobile Broadband Wireless Access (MBWA) according to IEEE standard 802.20, it is known to employ inserted acquisition information (e.g., AcqInfo) in a preamble of a transmission frame (e.g., a superframe) to assist in system acquisition. This information, however, does not presently communicate whether current transmission to a user device is according to TDD or FDD modes, leading to difficulty in timing acquisition. It is noted, however that the acquisition information (AcqInfo), according to IEEE 802.20, employs a HalfDuplexEnable bit that communicates whether transmissions during FDD mode are full duplex or half duplex, dependent on the binary state of the bit. In TDD modes, however, various different partitions of time divided resources for forward link transmissions (e.g., transmission from a base station or access point (AP) to a user equipment (UE), access terminal (AT) or mobile device) and reverse link transmissions (e.g., transmission from a UE, AT, or mobile device to a base station or AP) is known. If the particular partition ratio of downlink frames to uplink frames is not known by devices in the system, which is typical in known systems, timing acquisition may be further delayed.

SUMMARY

According to an aspect, a method for use in a wireless communication system is disclosed. The method includes providing at least one first information bit configured to indicate that the communication system is operating according to one of a time division duplex (TDD) mode and a frequency division duplex (FDD) mode. Further, the method includes providing the at least one first information bit in a preamble of a transmission frame.

According to another aspect, an apparatus operable in a wireless communication system is disclosed. The apparatus includes at least one processor configured to: provide at least one first information bit configured to indicate that the communication system is operating according to one of a time division duplex (TDD) mode and a frequency division duplex (FDD) mode. The at least one processor is also configured to provide the at least one first information bit in a preamble of a transmission frame. A memory coupled to the at least one processor is also included in the apparatus.

According to still a further aspect, a computer program product comprising computer-readable medium is disclosed. The computer-readable medium includes code for causing a computer to provide at least one first information bit configured to indicate that a wireless communication system is operating according to one of a time division duplex (TDD) mode and a frequency division duplex (FDD) mode. The medium also includes code for causing the computer to provide the at least one first information bit in a preamble of a transmission frame to be transmitted in the wireless communication system.

According to yet one further aspect, an apparatus operable in a wireless communication system is disclosed. The apparatus includes means for providing at least one first information bit configured to indicate that the communication system is operating according to one of a time division duplex (TDD) mode and a frequency division duplex (FDD) mode. Also included is means for providing the at least one first information bit in a preamble of a transmission frame.

DETAILED DESCRIPTION

The present disclosure features methods and apparatus that provide information in a transmission frame to communicate the mode of the transmission; namely, whether the transmission is an FDD or a TDD transmission. The information may comprise a single binary bit within a preamble of a transmission frame (i.e., a superframe) that communicates either an FDD or a TDD transmission mode to an apparatus receiving the transmission frame. Additionally, in another aspect the present disclosure also includes methods and apparatus that reuse an extant resource, such as a HalfDuplexEnable bit in a IEEE 802.20 system as an example, to not only communicate full or half duplex mode when transmitting according to FDD, but also with an added feature of communicating partition information when transmitting according to TDD.

Figure 1:
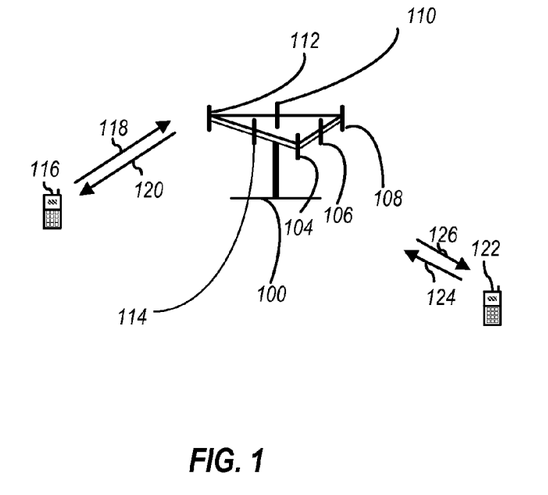
FIG. 1 is an exemplary wireless communication system in which the presently disclosed methods and apparatus may be employed.

FIG. 1 illustrates an exemplary wireless communication system in which the presently disclosed methods and apparatus may be employed. An access point 100 (AP) includes multiple antenna groups, one including 104 and 106, another including 108 and 110, and an additional including 112 and 114. Only two antennas are shown for each antenna group in FIG. 1. Notwithstanding, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124.

It is noted that the system of FIG. 1 may support both FDD and TDD modes. In an FDD mode, communication links 118, 120, 124 and 126 may use different frequency for communication. For example, forward link 120 may use a different frequency than that used by reverse link 118. It is further noted that an access point (e.g., 100) may be a fixed station used for communicating with the terminals and may also be referred to as an access point (AP), a Node B, base station, or some other terminology. An access terminal may also be called a user equipment (UE), a wireless communication device, a terminal, a user device, a mobile device, or some other terminology.

Figure 2:
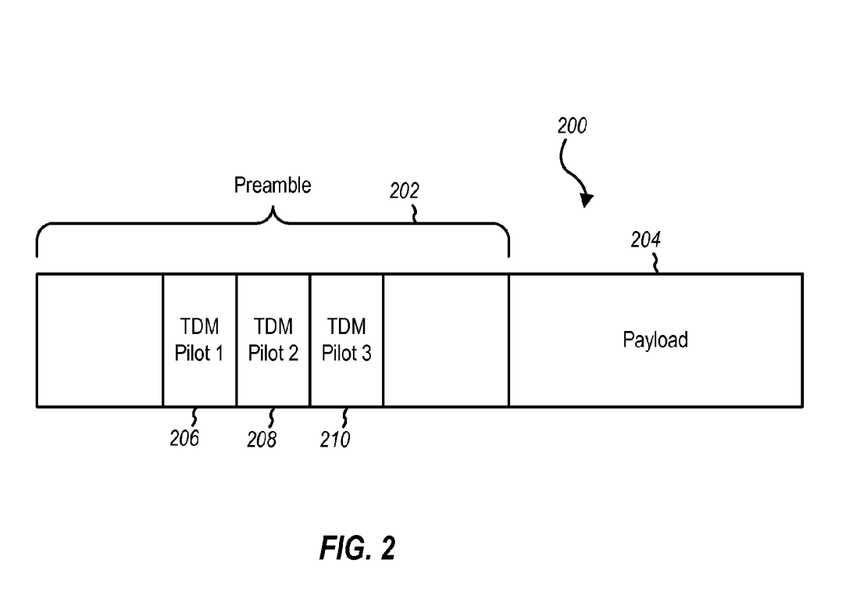
FIG. 2 shows a transmission frame format that may be utilized in the system of FIG. 1.

FIG. 2 shows a transmission frame format that may be utilized in the system of FIG. 1. As illustrated, the transmission frame 200, which may be a superframe as an example, includes a preamble 202 that contains various overhead symbols including symbols for system acquisition and timing acquisition. The transmission frame 200 also includes a payload 204, which contains the data to be transmitted by frame 200. In particular, frame 200 may include three time division multiplexed (TDM) pilot channels; namely TDM Pilot 1 (206), TDM Pilot 2 (208), and TDM Pilot 3 (210). TDM Pilot 1 206 is used by a transceiver for, among other things, coarse timing acquisition. TDM 1 206 is followed in time by TDM Pilot 2 208. TDM 2 208 may include a Pseudorandom number (PN) sequence or code that is used by a transceiver for fine timing acquisition or reacquisition.

TDM Pilot 3 channel 210 may be utilized to communicate additional system information to receiving devices. According to an aspect, it is noted that in MBWA systems (i.e., IEEE802.20 standard) information included in TDM Pilot 3 does not include information concerning whether the present transmission to the receiving device is FDD or TDD transmission. Accordingly, the present methods and apparatus provide at least one additional bit of information in the preamble, such as in TDM 3, that communicates whether the transmission is an FDD or a TDD transmission. As an example, a zero (0) state of the bit could indicate FDD mode and a one (1) state indicate TDD mode.

Also in MBWA systems (i.e., IEEE802.20 standard), in particular, the TDM 3 channel includes an acquisition information (AcqInfo) block (not shown) transmitted in the preamble for system acquisition. Accordingly, in an aspect, it is contemplated that the additional bit discussed above may be included in the AcqInfo block, but is not limited to such placement and may be included in any portion of a superframe preamble. Regardless whether the bit is added to the AcqInfo block or elsewhere in the preamble, the addition of this single bit adds minimal overhead to the superframe. It is noted that additional bits beyond one bit may be utilized in the preamble to communicate further information, or communicate modes if more than two modes are supported by a communication system, as another example.

Figure 3:
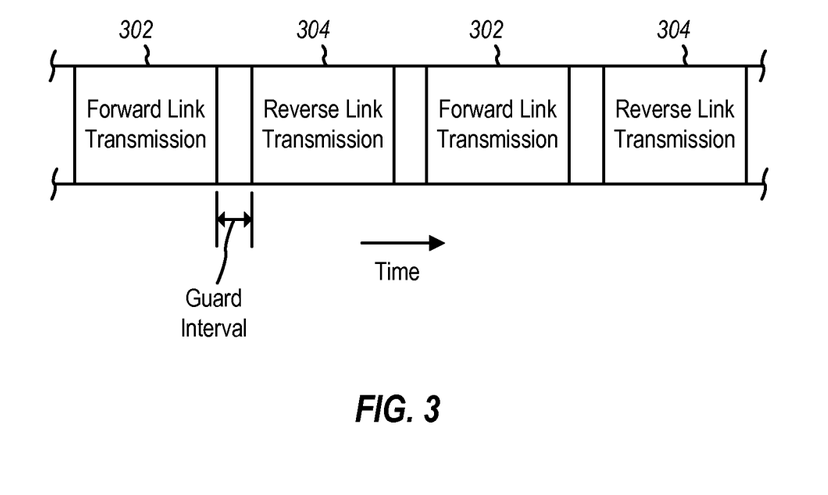
FIG. 3 shows an exemplary TDD transmission having a 1:1 partition ratio.
Figure 4:
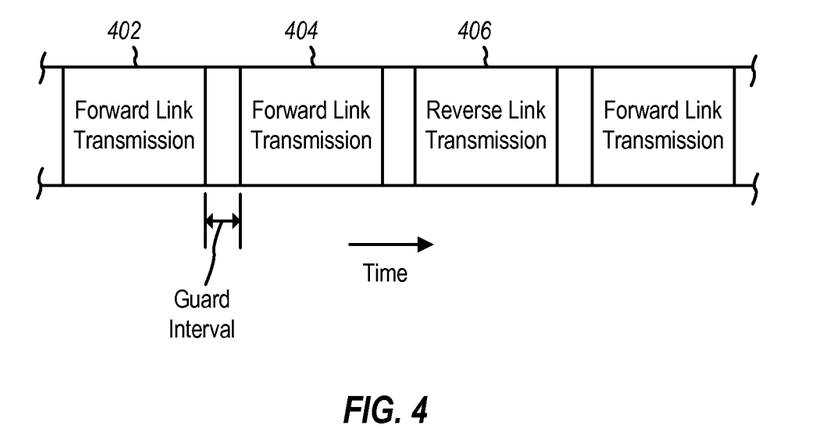
FIG. 4 shows an exemplary TDD transmission having a 2:1 partition ratio

It is known that in TDD transmissions particular forward link and reverse link duplexed transmissions are alternated or partitioned over time in particular prescribed ratios. As an illustration, FIG. 3 shows a TDD transmission having a 1:1 partition ratio, where forward link transmissions 302 alternate in time with reverse link transmissions 304. As another illustration of a different TDD partitioning, FIG. 4 shows a 2:1 partition ratio. Here every two forward link transmissions 402, 404 transmitted consecutively in time are followed by a single reverse link transmission 406.

In certain communication systems, it is known to utilize a bit in the preamble to indicate during an FDD mode whether the FDD transmission is full duplex or half-duplex. For MBWA systems, as a specific example, this existing bit is termed the "HalfDuplexEnable" bit and is located in the AcqInfo block. No indication is presently given in such systems operating in a TDD mode concerning the particular partitioning for the TDD transmission, such as the partitioning illustrated in FIGS. 3 and 4. According to a further aspect, it is contemplated that the existing bit in the preamble (e.g., the HalfDuplexEnable bit) may be used (or, in essence, reused) as an indicator of TDD partitioning as the bit is only presently being used in FDD mode. Thus, when the first bit discussed above indicates a FDD, the second bit indicates which of FDD full-duplex or half-duplex operation is being utilized. Additionally, when the first bit indicates TDD mode, the same second HalfDuplexEnable bit may be utilized to indicate which of two partition ratios is being used in the case of two modes. For example, if the second bit is set to a zero (0) state, then a TDD partition of 2:1 as illustrated in FIG. 4 is implied. Otherwise, a state of one (1) indicates another partitioning, such as a 1:1 partitioning as illustrated by FIG. 3. It is noted that this is merely an example of arbitrarily chosen ratios, and that various other ratios could be utilized in a system and, thus, implied by the bit selection. Furthermore, additional bits could be added to this information if more than two different TDD partitionings are utilized in a system.

Figure 5:
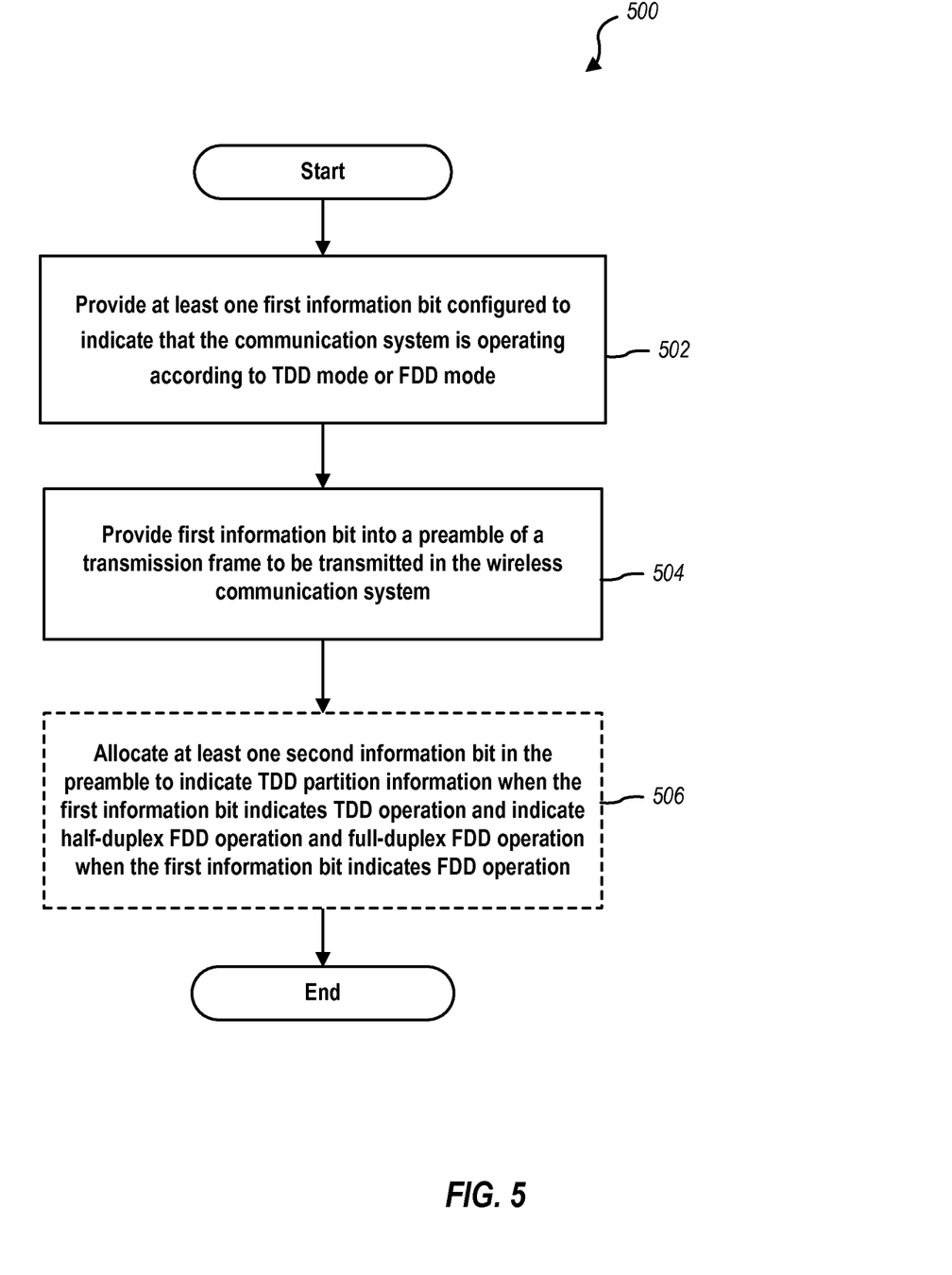
FIG. 5 illustrates a method for providing communication of FDD and TDD mode information in a wireless transmission.

FIG. 5 illustrates a method 500 for providing communication of FDD and TDD mode information that may be employed in a wireless communication system, such as the system of FIG. 1. Method 500 includes a first block 502 providing at least one first information bit that is configured to indicate that the communication system is operating according to TDD mode or FDD mode. As discussed previously, this first information bit may be a single binary bit, as an example, whose state implies either a current FDD transmission mode or a TDD mode. At block 504, this first information bit is then provided, placed, or inserted into the preamble of a transmission frame to be transmitted in the wireless communication system. It is noted that, as discussed previously, the first information bit may be inserted into the TDM Pilot 3 channel of a superframe, and in another aspect in an AcqInfo block in TDM Pilot 3 in the example of IEEE 802.20 systems.

FIG. 5 further illustrates an additional block 506, which provides an added, but alternative process as indicated by dashed lines. In particular, block 506 allocates at least one second information bit in the preamble to indicate TDD partition information when the first information bit indicates TDD operation and indicate half-duplex FDD operation and full-duplex FDD operation when the first information bit indicates FDD operation. It is noted that according to one aspect, the second information bit is the HalfDuplexEnable bit already present in the superframe preambles of systems operating according to IEEE 802.20, as discussed previously herein. Thus, the process of block 506 affords reuse of this information bit to communicate additional partitioning information concerning TDD transmissions, which eliminates the need for added resources while adding to the amount of information that may be conveyed in the preamble.

It is noted that the one or more of the processes of method 500 may be repeated for each superframe assembled and transmitted in a communication system. Alternatively, one or more of the processes of method 500 may be performed periodically, where only periodic superframes will be provided with the added bit information.

Figure 6:
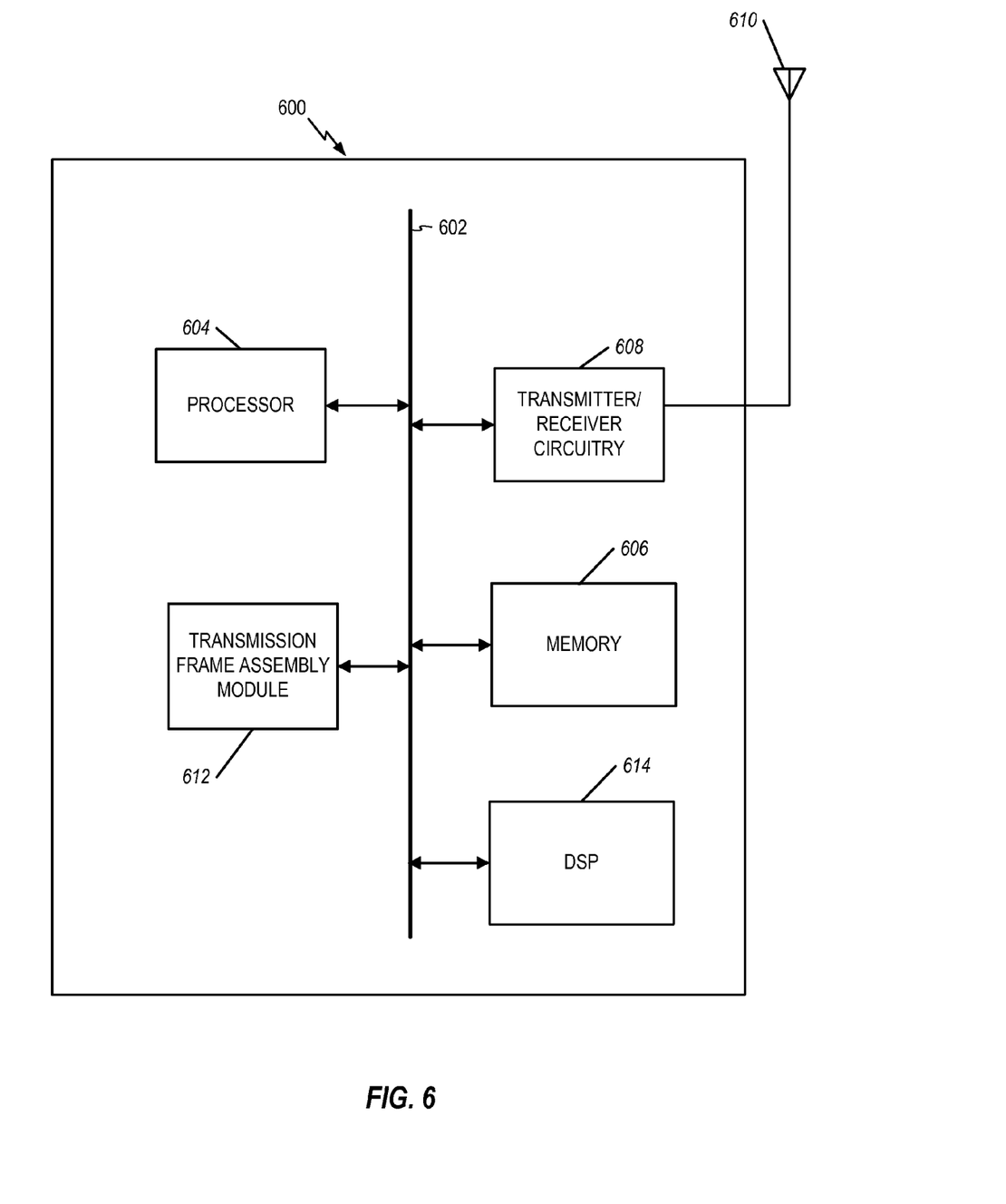
FIG. 6 illustrates an exemplary apparatus for effecting communication of FDD and TDD mode information in a wireless transmission.

FIG. 6 illustrates an apparatus for providing information concerning communication of a particular mode of transmission in a communication system supporting TDD and FDD. The apparatus 600 may include various components that may be utilized in a wireless device, such as base station or access point device 100 as illustrated in FIG. 1, or in other devices in a communication system such as user equipment 116, 122, as merely two examples.

Apparatus 600 may include a number of various components communicatively coupled by a communication bus 602, which may include a power bus, a control signal bus, a status signal bus, a data bus, any combination thereof, or any other suitable communication link. Also included in apparatus 600 is at least one processor 604 that controls operation of the apparatus 600. The processor 604 may also be referred to as a central processing unit (CPU). Apparatus 600 also includes a memory 606, which may include both read-only memory (ROM) and random access memory (RAM) that provides instructions and data to the processor 604. A portion of the memory 606 may also include non-volatile random access memory (NVRAM), as an example. The processor 604 is configured to perform logical and arithmetic operations based on program instructions stored within memory 606. Moreover, the instructions in memory 606 may be executable to implement the methods described herein.

Apparatus 600 may also include a transmitter/receiver circuitry 608 to provide transmission and reception of wireless signals between a wireless device employing apparatus 600 and another wireless device, for example. One or more antennas 610 may be communicatively coupled to the transmitter/receiver circuitry 608 as illustrated in FIG. 6. It is noted that a wireless device employing apparatus 600 may include multiple transmitters, multiple receivers, and/or multiple antennas.

Apparatus 600 may also include a transmission frame assembly module 612 configured as means to effect the functions and methods described herein, such as the various processes and functions described above in connection with FIGS. 2-5. Further, apparatus 600 may include a digital signal processor (DSP) 614 for use in processing signals received. It is also noted that either the processor 604 and/or the DSP 614 may subsume some or all of the functions performed by transmission frame assembly module 612, as alternative implementations.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The previous description of the disclosed examples is provided to enable any person skilled in the art to make or use the presently disclosed methods or apparatus. Various modifications to these examples will be readily apparent to those skilled in the art, and the generic principles defined herein may be applied to other examples without departing from the spirit or scope of the disclosure. It is also noted that the word "exemplary" is used exclusively herein to mean "serving as an example, instance, or illustration." Any example described herein as "exemplary" is not necessarily to be construed as preferred or advantageous over other examples. Thus, the present disclosure is not intended to be limited to the examples shown herein but is to be accorded the widest scope consistent with the principles and novel features disclosed herein.

What is claimed is:

1. A method for wireless communication, comprising:
receiving an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
communicating with the wireless communication system by a user device based on the TDD mode or the FDD mode as conveyed by the indication.

2. The method of claim 1, further comprising:
determining that the wireless communication system is operating in accordance with the TDD mode if the indication is set to a first value or the FDD mode if the indication is set to a second value.

3. The method of claim 1, further comprising:
determining that the wireless communication system utilizes a first TDD partition if the indication is set to a first value or utilizes a second TDD partition if the indication is set to a second value.

4. The method of claim 1, further comprising:
receiving a second indication conveying FDD operation of the wireless communication system when the wireless communication system is operating in accordance with the FDD mode; and
communicating with the wireless communication system based on the FDD operation of the wireless communication system.

5. The method of claim 4, further comprising:
determining that the wireless communication system utilizes half-duplex operation if the second indication is set to a first value or utilizes full-duplex operation if the second indication is set to a second value.

6. The method of claim 1, wherein the receiving the indication comprises receiving the indication via a pilot.

7. The method of claim 1, wherein the receiving the indication comprises receiving system information comprising the indication.

8. An apparatus for wireless communication, comprising:
means for receiving an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
means for communicating with the wireless communication system by a user device based on the TDD mode or the FDD mode as conveyed by the indication.

9. The apparatus of claim 8, further comprising:
means for determining that the wireless communication system is operating in accordance with the TDD mode if the indication is set to a first value or the FDD mode if the indication is set to a second value.

10. The apparatus of claim 8, further comprising:
means for receiving a second indication conveying FDD operation of the wireless communication system when the wireless communication system is operating in accordance with the FDD mode; and
means for communicating with the wireless communication system based on the FDD operation of the wireless communication system.

11. An apparatus for wireless communication, comprising:
at least one processor configured
to receive an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode, and
to communicate with the wireless communication system by a user device based on the TDD mode or the FDD mode as conveyed by the indication.

12. The apparatus of claim 11, wherein the at least one processor is configured to determine that the wireless communication system is operating in accordance with the TDD mode if the indication is set to a first value or the FDD mode if the indication is set to a second value.

13. The apparatus of claim 11, wherein the at least one processor is configured
to receive a second indication conveying FDD operation of the wireless communication system when the wireless communication system is operating in accordance with the FDD mode, and
to communicate with the wireless communication system based on the FDD operation of the wireless communication system.

14. A computer program product, comprising:
a non-transitory computer-readable medium comprising:
code for causing at least one processor to receive an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode, and
code for causing the at least one processor to communicate with the wireless communication system by a user device based on the TDD mode or the FDD mode as conveyed by the indication.

15. The computer program product of claim 14, wherein the non-transitory computer-readable medium further comprises:
code for causing the at least one processor to determine that the wireless communication system is operating in accordance with the TDD mode if the indication is set to a first value or the FDD mode if the indication is set to a second value.

16. The computer program product of claim 14, wherein the non-transitory computer-readable medium further comprises:
code for causing the at least one processor to determine that the wireless communication system utilizes a first TDD partition if the indication is set to a first value or utilizes a second TDD partition if the indication is set to a second value.

17. The computer program product of claim 14, wherein the non-transitory computer-readable medium further comprises:
code for causing the at least one processor to receive a second indication conveying FDD operation of the wireless communication system when the wireless communication system is operating in accordance with the FDD mode; and code for causing the at least one processor to communicate with the wireless communication system based on the FDD operation of the wireless communication system.

18. A method for wireless communication, comprising:
generating an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
transmitting the indication in a portion of a frame.

19. The method of claim 18, further comprising:
setting the indication to a first value to convey the wireless communication system is operating in accordance with the TDD mode or to a second value to convey the wireless communication system is operating in accordance with the FDD mode.

20. The method of claim 18, further comprising:
setting the indication to a first value to convey the wireless communication system is utilizing a first TDD partition or to a second value to convey the wireless communication system is utilizing a second TDD partition.

21. The method of claim 18, further comprising:
generating a second indication conveying FDD operation of the wireless communication system when the wireless communication system is operating in accordance with the FDD mode; and
transmitting the second indication in the portion of the frame.

22. The method of claim 21, further comprising:
setting the second indication to a first value to convey the wireless communication system is utilizing half-duplex operation or to a second value to convey the wireless communication system is utilizing full-duplex operation.

23. An apparatus for wireless communication, comprising:
means for generating an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
means for transmitting the indication in a portion of a frame.

24. The apparatus of claim 23, further comprising:
means for setting the indication to a first value to convey the wireless communication system is operating in accordance with the TDD mode or to a second value to convey the wireless communication system is operating in accordance with the FDD mode.

25. The apparatus of claim 23, further comprising:
means for generating a second indication conveying FDD operation of the wireless communication system when the wireless communication system is operating in accordance with the FDD mode; and
means for transmitting the second indication in the portion of the frame.

26. The method of claim 1, further comprising:
determining that the wireless communication system is operating in accordance with the TDD mode based on receiving the indication when the indication corresponds to the TDD mode.

27. The apparatus of claim 8, further comprising:
means for determining that the wireless communication system is operating in accordance with the TDD mode based on receiving the indication when the indication corresponds to the TDD mode.

28. The apparatus of claim 11, wherein the at least one processor is configured to determine that the wireless communication system is operating in accordance with the TDD mode based on receiving the indication when the indication corresponds to the TDD mode.

29. The computer program product of claim 14, wherein the non-transitory computer-readable medium further comprises:
code for determining that the wireless communication system is operating in accordance with the TDD mode based on receiving the indication when the indication corresponds to the TDD mode.

30. The method of claim 18, further comprising:
setting the indication to correspond to the TDD mode to convey the wireless communication system is operating in accordance with the TDD mode.

31. The apparatus of claim 23, further comprising:
means for setting the indication to correspond to the TDD mode to convey the wireless communication system is operating in accordance with the TDD mode.

32. A computer program product, comprising:
a non-transitory computer-readable medium comprising:
code for generating an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
code for transmitting the indication in a portion of a frame.

33. The computer program product of claim 32, wherein the non-transitory computer-readable medium further comprises:
code for setting the indication to correspond to the TDD mode to convey the wireless communication system is operating in accordance with the TDD mode.

34. An apparatus for wireless communication, comprising:
at least one processor configured to:
generate an indication conveying whether a wireless communication system is operating in accordance with a time division duplex (TDD) mode or a frequency division duplex (FDD) mode, wherein the indication comprises information conveying a TDD partition between forward link and reverse link when the wireless communication system is operating in accordance with the TDD mode; and
transmit the indication in a portion of a frame.

35. The apparatus of claim 34, wherein the at least one processor is configured to set the indication to correspond to the TDD mode to convey the wireless communication system is operating in accordance with the TDD mode.

* * * * *